UNITED STATES PATENT OFFICE.

RALPH W. CROCKER, OF CHICAGO, ILLINOIS.

FOOD PRODUCT AND PROCESS OF PREPARING SAME.

1,385,246. Specification of Letters Patent. Patented July 19, 1921.

No Drawing. Application filed May 26, 1919. Serial No. 299,897.

*To all whom it may concern:*

Be it known that I, RALPH W. CROCKER, a citizen of the United States, residing at Chicago, in the county of Cook and State of Illinois, have invented certain new and useful Improvements in Food Products and Processes of Preparing Same, of which the following is a specification.

This invention relates to improvements in cooked food products and processes. More particularly it relates to packing eggs. It is an object of the invention to provide for the preservation of the food values in eggs by the seasonal cooking and canning of them, thereby dispensing with the cost of cold storage, or of other methods of preservation, of eggs in the shell. So far as I am aware no one has heretofore been able to can eggs successfully on a commercial scale, if at all. Attempts to pack dried eggs and hard boiled eggs have resulted after a few months in the yolks separating and deteriorating into something resembling sulfur and molasses. It is an object of the invention to avoid this unpleasant result with such certainty that the packing of eggs can be made a commercial industry in which the product shall keep in acceptable condition for long and indefinite periods of time. It is another object to provide for the packing of meat or other food ingredients, such as fruit, oysters, fish, vegetables, with eggs. It is still a further object of the invention to provide an increased market for the residue of milk, remaining after its fats have been separated in the form of cream. Other objects are to solve the practical problem of combining these food ingredients, or some of them, in such pleasing manner that the package upon being opened is found attractive with the meat or other solid ingredient well distributed through the mass.

The invention also includes the provision of a new process for the preparation of food products, by which process the various ingredients to which the invention is applicable can be put together and preserved in such manner as to make the novel food product in its various forms. It is also the object of the invention to provide the other advantages herein disclosed. It is intended that the patent shall cover, by suitable expression in the appended claims, whatever features of patentable novelty exist in the invention disclosed.

One feature of the invention is the taking of a preliminary step which thoroughly breaks up the structure of the yolk. Another feature is the use of milk, which fills all spaces when well mixed with the yolk so that air is thoroughly excluded; and a third is the cooking of the egg and the milk so that the combination solidifies, or becomes colloidal, before packing in the final container. Another feature of importance is the method of insuring that the meat or other ingredient which is originally solid, shall be well distributed through the product, in which the difficulty arises from the fact that upon introduction the meat tends to settle through the liquid composed of the egg and the milk. Another feature is the use of direct steam contact for the early cooking process.

The method may begin by thoroughly beating the yolk and mixing the same thoroughly with milk, which may be skimmed milk, and a small portion of flour. The mixture is then poured into shallow pans. If a particularly artistic effect is desired these may be of the shape and size of the tin in which the product is ultimately to be sealed, and marketed. Obviously it may be of any of a wide variety of shapes. The partly filled pans are preferably adapted to pass through apparatus having a chamber wherein their open tops admit live steam to the contents of the pan. A partial cooking occurs, changing the mixture from liquid to solid or colloidal form. Upon removal of the pans from the steam slices of meat laid on the colloidal mixture will not sink. The meat being then so distributed over the surface, the remainder of the milk and egg mixture for the particular can is poured on top and the whole is then submitted to another and similar live steam exposure.

Becoming then a mass having definitely the shape and size of the can which is ultimately to contain it, the contents of this pan, which has served as a mold, may be tipped out into deep fat and fried, producing an external browning like an omelet, after which the mass may be put into its can, subjected to a suitable sterilizing and sealing process, and marketed.

The time and temperature of the sterilizing and processing may vary according to the materials which are being canned, as is already understood in the art, the egg being timed like meat.

An illustrative example, showing another form of the method is as follows. The mass of beaten egg and milk and flour having been made ready, and it being assumed that meat, such as dried beef, is to be packed with the egg and milk, a thin layer, for example ½" thick, of this meat is spread over the bottom of pans which may, for example, be 24" square and 1" deep. And into this layer the egg and milk liquid mixture is poured, deep enough to cover the meat. These pans are then subjected to steam heat or other source of high temperature for a few minutes, at a temperature sufficient to cook and to solidify the liquid, which may be at or a little above the boiling point of water. The solidified mass of eggs, milk and meat is then dumped out of the pans, or may be scooped out, and is put through a stuffing machine. If desired, it may first go through a coarse cutting machine, but this will ordinarily be unnecessary. The stuffing machine presses the material into the can in which it is to be marketed, incidentally destroying its pan-shaped formation; so that the broken but soft and yielding fragments of the mixture fill the can solidly, and the layer formation which characterized this material in the pan is entirely destroyed, but with the colloidal combination holding the meat particles separate from each other and at all degrees of elevation in the can. The can may then be sealed, sterilized and processed, according to the usual or any suitable process.

The egg package may have other food products as its filler, such as fruits, or the flesh of fowl, or fish, or it may have vegetable products. In case the second method is adopted, and the package is made without frying of the contents, or made by the first method without frying, said contents may nevertheless be ready for being eaten without further cooking. Whether fried or unfried, they constitute a thoroughly high grade, appetizing and tasty, nutritious food product. The form which avoids frying is preferred both because of economy, and because the tender characteristic of the smoked or dried beef or fish which may be used is not destroyed as it is in domestic usage by the frying process. As a matter of fact it has been observed that the process renders smoked or dried meat more tender than it was when it was introduced.

If fresh meat, fruit or vegetable is used it should first be cooked, before introduction to the egg and milk mixture. This partially breaks down its internal structure, shrinks it, and prevents the occurrence of material further shrinkage after it is in the final can.

The process is applicable with especial value in those regions of the country and at that season of year at which fresh eggs are produced in greatest abundance. The process does away with all loss and danger of breakage of the eggs in shipment; and the cost of and loss in freezing, or other storage method of keeping them fresh. It puts them into a form in which they can be kept indefinitely, to wit, the convenient and well known tin can form, regardless of problems of refrigeration, or of breakage, or of keeping them immersed in liquids; and at the same time, by handling them in large quantities, it accomplishes economically the ultimate cooking which could otherwise have to be done more wastefully under domestic conditions, this being accomplished as part of the process of preservation.

While the cooking is best carried out by direct heat from steam applied to the open top and to the sides and bottom of a shallow pan, in which case the solidification occurs with great speed, in a very few minutes, owing to the shallowness of the layers of material, to the approach of heat from both sides of this thin layer, and with great precision owing to the perfect control of temperature obtainable with saturated steam at close to atmospheric pressure, nevertheless the process can be carried out by other methods of heating. Perhaps the next best is by heat from a steam jacket around a metal container, commonly called a "steam kettle"; but as such a container is usually relatively deep it is desirable to provide a mechanical stirring of the contents, in order to get and maintain the proper distribution of the meat through the egg and milk mass, as it is coagulating, and until it coagulates. For this reason, as well as for other reasons, the simple process of pouring the material into shallow pans and running it through a chamber in which it is exposed to live steam, with the meat meanwhile resting on the bottom of the container, is preferred; and the proper distribution throughout the can in this case is then made by the subsequent breaking up and re-arrangement of fragments of the solidified layer.

In the product, using eggs at their minimum cost each year, and using skimmed milk, a product results whose lowness of cost is wholly out of proportion to the quality of the ingredients used, for the milk adds materially to the weight yet costs but little; and also its contained casein is an addition of definite food value.

Use of a very small portion of flour is preferable, for which purpose potato flour is advantageously used, because it will absorb more moisture than wheat flour. Such a flour contributes to the production of the colloidal stage by absorbing moisture. It is not essential. Its effect is to reduce the amount of shrinkage, to make the product less watery, and to make it solidify more quickly. For commercial purposes it is highly desirable to use the flour.

The proportions of milk and eggs may vary, but the general proportion of equal weights of eggs and milk has been employed with advantage. The proportion of flour may be one-fourth or less of an ounce to a pound of the eggs and milk mixture. If desired to make the product as largely egg as possible, the proportion of milk stated may be greatly reduced, only enough being used to prevent the above described disintegration into products resembling sulfur and molasses.

The process may be simplified further by pouring the well beaten mixture directly into the can which is to be its final package, and processing it therein. In that case however the pleasing broken-up and coarsely-granular aspect of the product, seen upon opening the can and attained by first solidifying the material in a shallow pan and then breaking it up for packing in a deep can, is not obtained. The processing should be combined for such length of time, and at such temperature as is necessary for the ingredient therein which requires the most of such.

If desired, spices or other ingredients may be included in the mixture.

In its physical state herein described as "colloidal" the product is neither definitely liquid nor rigidly solid. It is firm enough to hold its shape and to support solid particles within it, yet is jelly-like and readily broken into fragments, somewhat resembling what is known in domestic usage as "scrambled eggs." It however has the quality of resisting the tendency to dissolution which has been manifest with lapse of time, with eggs as heretofore packed.

I claim as my invention:—

1. A method of preparing and preserving eggs for market, comprising thoroughly beating eggs with milk; subjecting the mixture in layer form to steam making direct contact with its surface; sealing in cans and sterilizing.

2. A method of preparing and preserving food for market, comprising thoroughly beating eggs with milk, arranging a solid food ingredient on a support; pouring some of the egg and milk mixture upon said solid food and its support, thereby inclosing the solid food; and causing the mixture thus poured to become colloidal and thus to fix the relative positions of parts of the solid ingredient; and sealing and sterilizing the whole in cans.

3. A method of preparing and preserving eggs for market, comprising thoroughly beating eggs with milk; cooking the mixture by steam, at approximately the temperature of the steam; and sealing and sterilizing in cans.

4. A new article of manufacture consisting of an hermetically sealed can of colloidal egg-and-milk food product.

5. A new article of manufacture consisting of an hermetically sealed can of colloidal egg and milk food containing a small quantity of the product resulting from the dissemination, prior to the colloidal formation, of a relatively very small quantity of flour disseminated throughout its mass.

Signed at Boston, Massachusetts, this 17th day of May, 1919.

RALPH W. CROCKER.